March 17, 1953 — J. A. RONNING — 2,631,418
MOBILE LEAF GATHERING, COMMINUTING AND REDISTRIBUTING MACHINE
Filed March 15, 1948 — 3 Sheets-Sheet 1
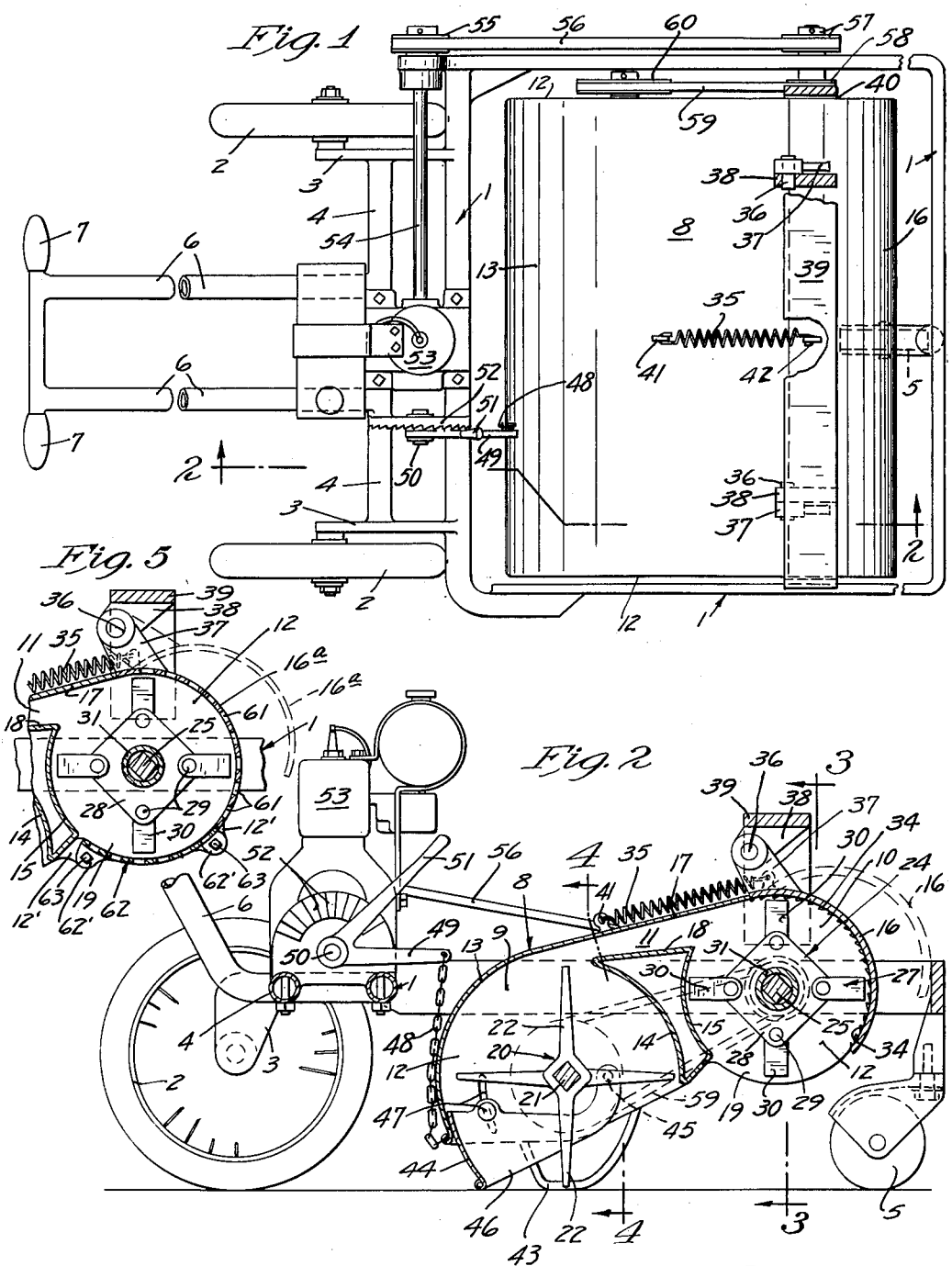
Inventor
Jacob A. Ronning
By his Attorneys
Merchant & Merchant March 17, 1953  J. A. RONNING  2,631,418
MOBILE LEAF GATHERING, COMMINUTING AND
REDISTRIBUTING MACHINE
Filed March 15, 1948  3 Sheets-Sheet 2
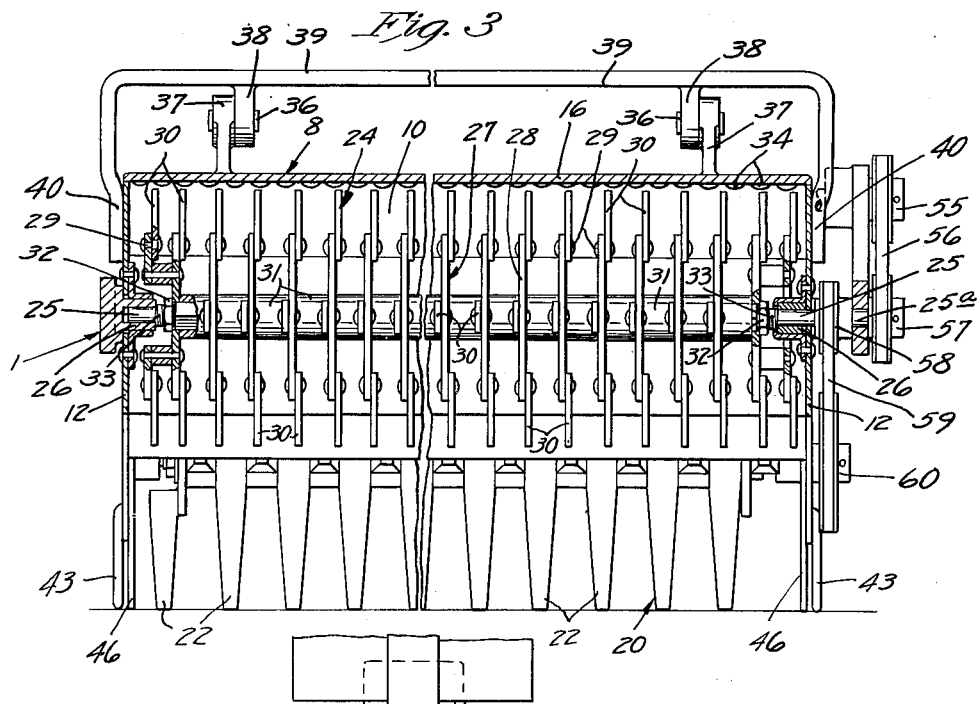
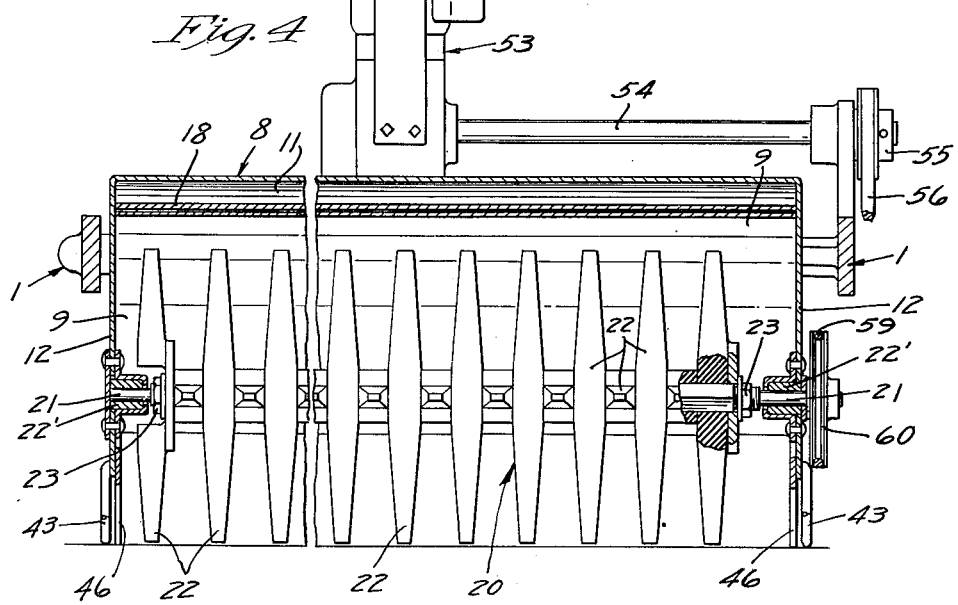
Inventor
Jacob A. Ronning
By his Attorneys
Merchant & Merchant March 17, 1953
J. A. RONNING
2,631,418
MOBILE LEAF GATHERING, COMMINUTING AND
REDISTRIBUTING MACHINE
Filed March 15, 1948
3 Sheets-Sheet 3
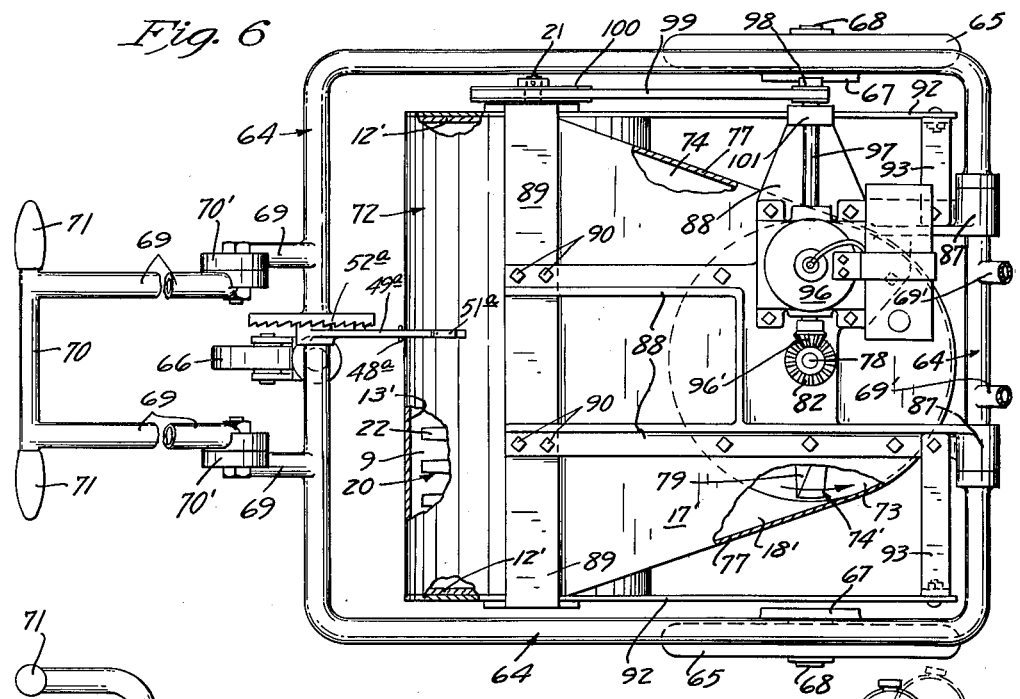
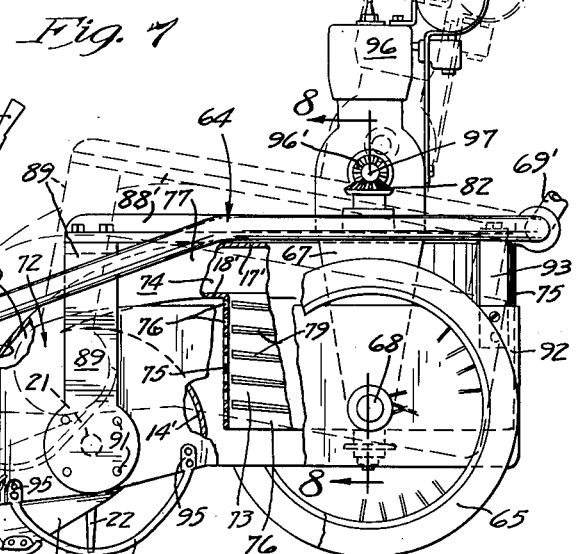
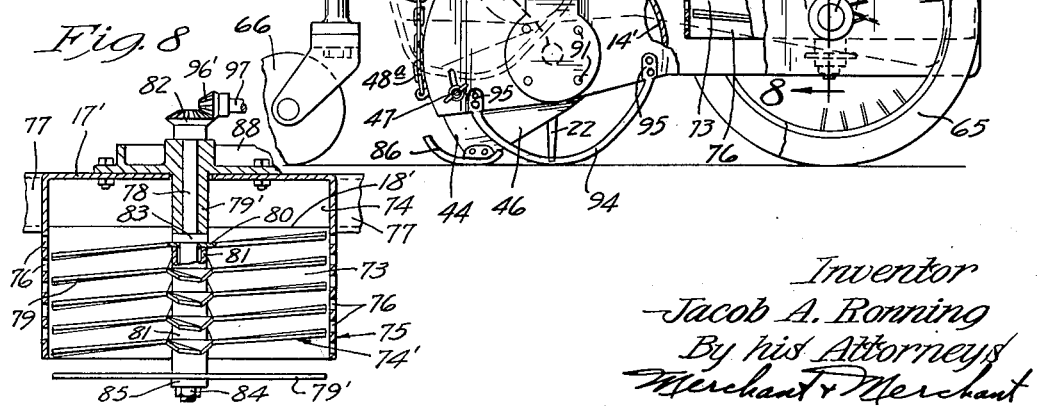
Inventor
Jacob A. Ronning
By his Attorneys
Merchant & Merchant Patented Mar. 17, 1953

2,631,418

UNITED STATES PATENT OFFICE 2,631,418

MOBILE LEAF GATHERING, COMMINUTING, AND REDISTRIBUTING MACHINE

Jacob A. Ronning, Minneapolis, Minn.

Application March 15, 1948, Serial No. 14,904

4 Claims. (Cl. 55—118)

Generally stated, my present invention relates to improvements in machines for the efficient handling of leaves which have fallen to the ground from deciduous trees.

At the end of the growing season each year, lawns of closely-cut grass about houses and garden areas, and in parks, playgrounds, cemeteries and the like, become littered with leaves falling from deciduous trees. These leaves are usually removed and disposed of, by dumping or burning at some remote place, to restore the otherwise well-kept appearance of the closely-cut grass lawn, and to safeguard the roots of the grass against suffocation during the long period required to bring about disintegration of the leaves by natural processes. This practice of disposing of leaves by removal is very costly in terms of man hours, and has the further disadvantage of depriving the soil of valuable and much-needed nourishment.

Broadly stated, an important objective of the present invention is the provision of an improved mobile machine which, when moved over a surface on which leaves are deposited, will gather leaves, break the same into small particles, and distribute the leaf particles over the surface as a mulch that will be disintegrated rapidly by nature to restore valuable nourishment to the soil, but which, in the interim between distribution and disintegration, will protect the roots of grass and plants from heat, cold and drought without smothering the same.

Another broad object of the instant invention is the provision of an improved machine of the class described, whereby the operations of gathering the leaves from the ground, breaking the leaves down into fine particles and redistributing the leaves over the ground as a mulch, are carried out automatically, successively and with greater efficiency and rapidity than has hitherto been possible or practical.

A still further object of the present invention is the provision of a machine of the kind described, which is simple and durable of construction and can be produced and maintained at relatively low cost.

In accordance with the present invention, leaves are gathered from the surface being traversed by the machine and delivered to the comminutor chamber within which they are subjected to a comminuting action, and from which they are discharged back onto the surface being traversed, the comminuting action preferably be-accomplished, in all instances, by a comminutor rotor.

A still further and more specific object of the invention is the provision, in a machine of the class described and having a unitary housing structure defining a sweeper chamber and a comminutor chamber, of an improved mounting for the housing unit whereby that portion of the housing unit defining the sweeper chamber will move upwardly and downwardly as it passes over irregularities in ground surface contour to maintain maximum efficiency of the sweeper while substantially maintaining the elevation of the comminutor and the extent of and pattern of redistribution therefrom.

The above and other important objects and advantages of the invention will be made apparent from the following specification, claims and appended drawings.

In the accompanying drawings, like figures indicate like parts throughout the several views.

Referring to the drawings:

Fig. 1 is a plan view, with some parts broken away, of a machine embodying one form of the instant invention;

Fig. 2 is a sectional view taken on the line 2—2 of Fig. 1, with some parts broken away;

Fig. 3 is a sectional view taken on the line 3—3 of Fig. 2, with some parts broken away;

Fig. 4 is a sectional view taken on the line 4—4 of Fig. 2, with some parts broken away;

Fig. 5 is a fragmentary sectional view corresponding to Fig. 2, but showing a somewhat modified form of the invention;

Fig. 6 is a plan view of a machine embodying still another form of the invention, some parts being broken away;

Fig. 7 is a view in side elevation, with some parts broken away, and some parts shown in section, of the machine of Fig. 6; and Fig. 8 is a detail sectional view taken on the line 8—8 of Fig. 7.

Description of Figs. 1 to 4, inclusive

In these figures, the main frame of the machine is rectangular and is indicated by the numeral 1. This rectangular frame 1 is mounted on a laterally spaced pair of ground wheels 2 through the medium of rearwardly extending rigid frame arms 3 that are tied together by a cross member 4. The front end of the rectangular frame 1 is supported from the ground by a caster-acting wheel 5, and the said machine is manually propelled and guided by rearwardly extending bars 6 equipped at their outer ends with handles 7.

Disposed within the rectangular frame structure 1 is a unitary housing structure indicated as an entirety by 8, and which defines a sweeper chamber 9 and a comminutor chamber 10 in receiving communication with the sweeper chamber 9 through an elongated inlet passage 11. The said housing structure 8 comprises laterally spaced end walls 12 adjacent opposite parallel sides of the rectangular frame 1, and which are common to the sweeper and comminutor chambers, a generally circular peripheral sweeper chamber wall extending between the end walls 12 and comprising arcuate sections 13 and 14, and a generally circular peripheral comminutor chamber wall also extending between the end walls 12 and comprising arcuate sections 15 and 16, a straight intermediate wall section 17 connecting the arcuate sections 13 and 16, and a wall section 18 connecting the upper ends of arcuate wall sections 14 and 15. The opposed wall sections 17 and 18 define the inlet passage 11 to the comminutor chamber 10, the latter being substantially tangential to the chambers 9 and 10. By reference to Fig. 2, it will be seen that the opposed wall sections 17 and 18 defining respectively the top and bottom of the passage 11 diverge with respect to one another from the sweeper chamber 9 toward the comminutor chamber 10, so that the maximum restrictions offered by said passage is immediately adjacent the sweeper chamber 9. By further reference to Fig. 2, it will be seen that the lower ends of the arcuate wall sections 13 and 14 are quite widely spaced to provide a relatively large intake opening in the bottom of the sweeper chamber and that the arcuate wall sections 15 and 16 are spaced apart at their lower ends to provide a relatively large and unrestricted redistributing outlet passage 19 from the comminutor chamber. In the arrangement here illustrated, the comminutor chamber 10 is disposed forwardly of the sweeper chamber 9 and the axes of said chambers 9 and 10 are parallel and extend transversely of the machine.

Substantially concentrically disposed within the sweeper chamber 9 is a sweeper rotor, which is indicated as an entirety by 20, this sweeper rotor 20 comprising a rotor shaft 21 having its ends journalled in bearings 22' mounted on opposite housing side walls (see Fig. 4), and having a rectangular intermediate portion and a plurality of sweeper devices 22 mounted on the rectangular intermediate portion of the shaft 21 for common rotation therewith. The several sweeper devices 22 are cast from resilient material, such as rubber or synthetic rubber, and are subject to axial clamping pressure on the rectangular intermediate portion of the shaft 21 by clamping nuts 23 screw threaded on the shaft adjacent opposite ends of the enlarged rectangular portion thereof.

Substantially concentrically disposed within the comminutor chamber 10 is the comminutor rotor, which is indicated as an entirety by 24. The comminutor rotor comprises a shaft 25 having cylindrical ends journalled in bearings 26, and having a rectangular intermediate portion. Mounted in axially spaced relation on the cross-sectionally rectangular portion of the shaft 25 are pluralities of comminuting devices each indicated as an entirety by 27. These comminuting devices 27 each comprise a generally rectangular hub plate 28 having pivoted thereto at 29 adjacent each of its four corners a comminutor blade 30. The hub plates 28 have rectangular bores to match the rectangular portion of the shaft 25 and are maintained in definitely spaced relation on the rectangular intermediate portion of the shaft 25 by cylindrical spacing sleeves 31. The several rectangular hub plates 28 and intervening spacing sleeves 31 are clamped together by means of clamping nuts 32 screw threaded on diametrically enlarged threaded portions 33 of the shaft 25 beyond opposite ends of the rectangular intermediate portion of the shaft. As will be seen, by reference particularly to Fig. 2, the free ends of the pivoted comminutor blades 30 work close to the inner periphery of the comminutor chamber defined by peripheral wall sections 15 and 16. By further reference to Fig. 2, it will be seen that the inner surface of the peripheral comminutor chamber wall section 16 is imperforate, but is of irregular contour for cooperation with the ends of the comminutor blades 30 in producing a grinding action and thereby facilitate the comminuting action. In this case, the irregularity of contour is accomplished by serrating the inner surface of the section 16 to provide a multiplicity of closely spaced teeth 34. Of course, in this form the entire discharge from the comminutor chamber will be through the opening 19 in the bottom thereof.

By reference to Figs. 2 and 4, it will be noted that the minimum dimension of the intake end of the inlet passage 11 at any point longitudinally thereof is from top to bottom as measured between opposed wall sections 17 and 18. By further reference to Figs. 2 and 4, it will be seen that the minimum or vertical dimension of said passage 18 at the intake end thereof is much less than the minimum dimension of said passage 11 at the outlet end thereof, is much less than the minimum dimension between the hub plates 28 and the inner periphery of the comminutor chamber wall sections 15 and 16, and is also much less than the minimum dimension of the comminutor chamber outlet passage 19 as measured from the lower ends of wall sections 15 and 16. Hence, it will be seen that any ordinary object capable of passing through the inlet end of the passage 11 will freely pass through the balance of the said passage 11, will pass through the comminutor chamber without danger of being jammed between the hub flanges 28 and the inner peripheral surface of the comminutor chamber, and will freely pass through the outlet passage 19 of the comminutor chamber. However, there is the possibility of a hard elongated object, such as a stick, spike, elongated stone, bone or the like being picked up by the sweeper rotor and being passed through the passage 11 with its greatest dimension extending transversely of the passage 11 and becoming turned after entering the comminutor chamber so as to become crowded between the rotor hub flanges 28 and the inner surface of the comminutor chamber wall section 16. To safeguard the comminutor against such a contingency, I have mounted the arcuate wall section 16 for outward swinging movements against the yielding action of a spring 35 (see Fig. 2). In the preferred arrangement illustrated, the arcuate comminutor chamber wall section 16 is mounted for pivotal outward swinging movements on a shaft 36 extending transversely of the machine and parallel to the axis of the comminutor shaft 25, by means of upstanding lugs 37 formed integrally or at least made rigid with the wall section 16. The shaft 36 is, in turn, carried by spaced bearing flanges 38 depending from the intermediate horizontal portion of an inverted U-shaped beam 39, the depending ends of which are rigidly anchored to the opposite side walls 12 of the casing, as shown best at 40 in Fig. 3. By reference particularly to Fig. 2, it will be seen that the pivot shaft 36 for the wall section 16 is close to the junction between wall sections 17 and 18, but is located radially outwardly of the adjacent ends of said sections. The tension spring 35 which normally maintains the section 16 in its closed operative position is anchored to the housing wall section 17 at 41 and to the pivotally movable wall section 16 at 42. The arrangement illustrated in swingable wall section 16 overlaps the arcuate front ends of the wall sections 12 and bears thereagainst when in its closed operative position, shown by full lines in Figs. 2 and 3. Hence, the said arcuate front ends of the end or side walls 12 provide positive stops for the swinging wall section 16 when it reaches its operative closed position. With this arrangement, the wall section 16 will remain in its closed operative position under all normal operating conditions, but will swing outwardly to or toward its inoperative dotted line position of Fig. 2 whenever any object should become jammed therebetween and the comminutor rotor, or whenever centrifugal force thereagainst becomes abnormally great, as for example in case a very heavy stone or other foreign object should be revolved thereagainst by the comminutor rotor at great speed producing abnormally great centrifugal pressure thereagainst. In such contingencies, the wall section 16 will spring to its dotted inoperative position and permit premature discharge of the foreign material object.

Preferably, and as shown, the entire housing structure defining the sweeper chamber 9, comminutor chamber 10 and passage 11, is pivotally mounted on the rectangular frame 1 concentrically with the axis of the comminutor rotor shaft 25, in the manner shown best in Fig. 3 and which is as follows: The right-hand end of shaft 25, as viewed in Fig. 3, extends through the housing mounted bearing 26 and adjacent end wall 12 and is journalled directly in the adjacent side of the rectangular frame 1 at 25a. The left-hand end of the rotor shaft is journalled in the adjacent bearing 26, which bearing is, in turn, journalled in the adjacent housing end wall 12 and is rigid with the adjacent side of the rectangular frame 1. The rear end of the said housing structure is supported directly from the ground and independently of the frame structure 1 by ground-engaging supports in the nature of runner-acting skids 43 carried by opposite housing end wall plates 12 and having its center points of contact with the ground in the line of a vertical plane intersecting and extending longitudinally of the axis 20 of the sweeper rotor. With this arrangement, the said housing structure and the sweeper rotor 20 will move pivotally on the axis of the comminutor rotor in following irregularities of ground contour without varying the relation of the bottom of the sweeper rotor 20 from the ground.

In the form of the invention hereof shown in Figs. 1 to 4, inclusive, the arcuate chamber wall section 13 terminates in spaced relation to ground level, but is effectively extended to ground level by means of an arcuate skirt 44 which is pivoted to the end wall plates 12 of the housing structure at 45 by integrally-formed arms 46, upward and downward pivotal movements of the skirt 44 being limited by slot and pin arrangement shown best at 47 in Fig. 2. When it is desired to permit elevation of the comminutor chamber and rotor to an inoperative position for transportation purposes, I provide lifting mechanism comprising a chain 48 and a bell crank 49 pivoted to the frame structure at 50 and provided with an operator's handle 51. The bell crank 49 is retained in adjusted position by engagement of pawl-acting teeth formed thereon with similar teeth formed in a frame-carried sector 52, the operator's handle-equipped arm of the bell crank 49 having sufficient lateral resiliency to permit disengagement of the cooperating teeth under manually applied lateral pressure exerted through the handle 51.

The sweeper rotor 20 and comminutor rotor 24 are driven in clockwise directions with respect to Fig. 2 from a suitable source of power, such as the frame-mounted internal combustion engine 53 through power transmission connections comprising an engine driven shaft 54, a V-pulley 55 fast on one end of the said shaft, a V-belt 56 running over V-belt pulley 55, and a similar pulley 57 fast on the comminutor rotor shaft 25, a V-belt pulley 58 fast on the comminutor rotor shaft 25 between the frame 1 and the adjacent side wall 12, and a V-belt 59 running over the pulley 58, and a similar pulley 60 on the projected end of the sweeper rotor shaft 21.

Description of Fig. 5

In Fig. 5, parts identical to parts in Figs. 1 to 4, inclusive, are indicated by like characters, but parts broadly corresponding to parts of Figs. 1 to 4, inclusive, but differing in detail therefrom, are indicated by like characters plus the exponent $a$. Fig. 5 differs from Figs. 1 to 4, inclusive, in the following ways: In Fig. 5, the arcuate comminutor chamber wall section 16a is foraminous to provide intermediate the inlet passage 11 and outlet passage 19 a plurality of highly restricted outlet passages 61 for the discharge and redistribution of fines of predetermined maximum particle size. This is distinguished from the imperforate corresponding wall section 16 in Fig. 2 hereof. Also, in Fig. 5, I have provided a displaceable closure 62 for the large unrestricted outlet passage 19 from the comminutor chamber 10. This closure 62 is in the nature of a removable arcuate wall section which, when in its operative position shown in Fig. 5, is substantially contiguous with the peripheral wall sections 15 and 16. The closure element 62 is foraminous or screen-like to provide a further plurality of highly restricted redistributing discharge passages 61 for fines, and said element 62 is removably held in place by cooperating depending anchoring flanges 12' and 62' and screws or bolts 63 passed through the cooperating flanges 12' and 62'. The flanges 12' and 62' are respectively formed as integral parts of the housing side wall plates 12 and said closure 62, and bolts or screws are passed through the cooperating flanges. When the closure 62 is removed, the comminutor mechanism will function exactly as does the form of the invention shown in Fig. 2 with the exception that some of the fines will be discharged through the perforations or restricted outlet passages 61 before reaching the unrestricted outlet passages 19. However, when the closure 62 is in its operative position shown in Fig. 5, the machine will then normally function in a manner that leaves and other analogous material entering the comminutor chamber 10 will be circulated and recirculated therein until finally broken down into particle or object size capable of discharge through the restricted outlet passages 61. Of course, if any object should become jammed between the pivotally mounted yieldingly closed section 16a and the rotor, or if the rotating load within the comminuting chamber should become unduly great for any reason, the said wall section 16a will automatically move outwardly to its open dotted line position of Fig. 5 and provide a relatively unrestricted outlet passage intermediate the peripheral wall forming portions 16a and 62. Not only is this important for the automatic discharge of extra heavy or large foreign objects from the comminutor chamber, but it is also important as a means for automatically preventing a complete choking up of the comminutor chamber under conditions where, due to moisture conditions or the nature of the material being injected into the comminutor chamber by the sweeper, it cannot be assimilated by the comminutor as fast as it is being introduced thereto.

While the mechanism for removing leaves from the surface being traversed and feeding the same to the comminutor chamber 10 is illustrated and described as being in the nature of a sweeper comprising a sweeper chamber and a sweeper rotor, it will be understood that this mechanism may be more broadly defined as a pick-up mechanism or as a gathering mechanism.

Description of Figs. 6 to 8, inclusive

In these Figures 6 to 8, inclusive, the main frame of the machine is generally rectangular and is indicated as an entirety by 64. This rectangular frame 64 is supported from a pair of axially spaced ground wheels 65 and a single caster 66. The axially spaced ground wheels 65 are connected to laterally opposite sides of the rectangular frame 64 by means of depending flange-like mounting brackets 67 and stub axles 68. The caster wheel 66 is located at the rear of the frame 64 and connects to the transverse center of the rear transverse rail or bar of the rectangular frame 64, shown best in Figs. 6 and 7. Projecting upwardly and rearwardly from the rear of the rectangular frame 64 are rigidly secured bars 69 provided at their outer ends with a cross bar 70 and operator's handle 71 for use by an operator in guiding and propelling the machine.

Disposed within the rectangular frame 64 is a housing structure, indicated in its entirety by 72, defining a sweeper chamber 9, and a unitary comminutor chamber 73 in receiving communication with the sweeper chamber 9 through an elongated inlet passage 74. The sweeper chamber 9 of Figs. 6 and 7 is substantially identical to the sweeper chamber 9 of Figs. 1 to 4, inclusive, and has journalled therein and working through the bottom thereof a rotary sweeper 20, which is identical to the sweeper 20 of Figs. 1 to 4, inclusive, and has such parts as are shown indicated by characters assigned thereto in Figs. 1 to 4, inclusive. The primary distinction between the form of the invention shown in Figs. 6 to 8, inclusive, and the form described in connection with Figs. 1 to 4, inclusive, resides in the comminutor. In Figs. 6 to 8, inclusive, the comminutor chamber 73 is generally cylindrical and is disposed on an upwardly and downwardly directed substantially vertical axis, as is also the comminutor rotor, which is indicated as an entirety by 74'. The generally cylindrical side wall of the comminutor chamber 73 is indicated by 75 and, as shown, is preferably foraminous to provide a multiplicity of closely spaced highly restricted outlet passages 76 for fines located radially outwardly of the comminutor rotor. The bottom of the comminutor chamber 73 is open to provide a large and unrestricted outlet passage axially outwardly of the plane of the end of the comminutor rotor 74' wherethrough objects will be downwardly discharged onto the surface being traversed substantially without regard to object size. The sweeper chamber 9 is defined by laterally spaced side wall forming plates 12' adjacent opposite ends of the sweeper rotor 20 and to which the sweeper rotor is journalled in the manner of Figs. 1 to 4, inclusive, and generally arcuate peripheral wall sections 13' and 14', all of which are substantially equivalents, respectively, of the wall sections 12, 13 and 14 of Figs. 1 to 4, inclusive. The inlet passage 74 to the comminutor chamber 73 is similar in vertical cross-section to the inlet passage 11 of Figs. 1 to 4, and is defined by upper and lower walls 17' and 18', respectively, and side walls 77 that converge from the side plates 12' of the sweeper rotor 20 of Figs. 1 to 4, inclusive, toward the upper portion of the generally cylindrical wall 75 of the comminutor chamber and merge therewith. The upper wall section 17' forming the top of the inlet passage 74 is tangential with the arcuate wall 13 of the sweeper chamber and extends over the top of the cylindrical comminutor chamber 73 and closes the top thereof. By reference to Fig. 7 it will be seen that the inlet passage 74 to the comminutor chamber opens thereinto above the plane of the end of the comminutor rotor 74'.

The comminutor rotor 74' comprises a comminutor shaft 78 concentrically disposed in the comminutor chamber and journalled in a bearing 79' mounted on the upper closed end of the comminutor chamber defined by wall 17, and an axially spaced series of circumferentially spaced sets of comminutor blades 79. As shown, there are four circumferentially spaced blades 79 to each set thereof, the several blades of each set being formed integrally with and projecting radially from a common hub portion 80. The hubs 80 are bored to receive the shaft 78 and are definitely spaced apart on the shaft 78 by interposed spacing sleeves 81. The shaft 78 is held against downward movements through the bearing 79' by engagement of the hub of a bevel gear 82 with the upper end of the bearing 79', and the said shaft 78 is held in the bearing 79' by engagement of a shaft flange 83 with the lower end of the bearing 79'. The several comminutor blade hubs 80 and interposed spacing sleeves 81 are tightly clamped together and locked to the shaft 78 for common rotation therewith by a nut 84 applied to the screw threaded lower end of the shaft 78 and a clamping collar 85. The free ends of the blades 79 work close to the interior of the cylindrical wall 75 of the comminutor, the said blades being all slightly pitched in the manner of propeller blades. In this last connection, it will be noted, by reference particularly to Fig. 8, that circumferentially alternate blades of each circumferentially spaced set thereof are oppositely pitched.

Preferably, and as shown, the shaft 78 extends downwardly beyond the bottom of the chamber 73 and is equipped therebelow with a diametrically opposed pair of spreader blades 79'. The blades 79', as shown, have no pitch and intercept some of the material discharged through discharge passage 76 and spread the same radially outwardly of the comminutor chamber in all directions to equalize the distribution of material discharged from the comminutor chamber over the surface being traversed.

In Fig. 7, the peripheral wall portion 13 of the sweeper chamber is shown as being effectively extended to ground level through the medium of a pivotally movable skirt 44, which is like the skirt 44 of Fig. 2, and is mounted in a like manner. However, in Fig. 7, the said skirt 44 is shown as being provided at laterally spaced sides and adjacent its bottom edge with runner-like elements 86 to better adapt the machine to operation in either of two directions longitudinally thereof.

The entire housing structure 72 is pivotally mounted on the rectangular frame structure 64 adjacent the upper front end portion of the comminutor chamber by bearing sleeves 87 journalled on the transverse front bar of the rectangular frame 64 and supplementary frame structure 88, with which the said bearings 87 are rigid. This supplementary frame structure 88, as shown, is substantially H-shaped and is shown as bolted or otherwise directly secured to the upper surface of the wall section 17' defining the top of the comminutor chamber 73. An inverted U-shaped frame member 89 has its upper intermediate portion secured at 90 to the rear ends of the supplementary frame 88, and the opposite legs of said inverted U-shaped member 89 embrace and closely engage opposite side wall forming plates 12 of the sweeper chamber and are secured thereto as at 91.

In the embodiment of the invention shown in Figs. 6 to 8, inclusive, fines are discharged radially from the vertical axis of the comminutor chamber through the small outlet passages or perforations 76 in the cylindrical wall 75 of the comminutor chamber. Hence, to confine this radial discharge from the comminutor chamber to the path traversed by the sweeper rotor 20, I provide in laterally spaced relation to diametrically opposite sides of the comminutor chamber, a pair of discharge confining baffle plates 92, shown best in Figs. 6 and 7. These baffle plates 92 are secured directly to the end or side plates 12' of the sweeper chamber and are interposed therebetween and the depending legs of the inverted U-shaped member 89. The plates project forwardly from the sweeper chamber to points laterally opposite the front extremity of the cylindrical wall 75 of the comminutor chamber, the said front end portions of the plates 92 being made fast to the H-shaped supplementary frame 88 by means of brackets 93.

The rear end portion of the housing structure 72 which defines the comminutor sweeper chamber 9, together with the sweeper rotor 20, is supported directly from the ground by runner-acting skids 94 corresponding to the skids 43 of Fig. 2, and similarly orientated with respect to the sweeper rotor 20, these skids being anchored directly to the sides of the housing structure at 95. With this arrangement, the entire housing structure and parts carried thereby will rock vertically on the forwardly located axis of the pivot joint 87 as the skids 94 encounter irregularities in ground contour and without reducing the clearance between the bottom of the comminutor chamber and the ground.

For rocking the housing structure and rotors from a sweeper operative position, shown by full lines in Fig. 7, to a sweeper inoperative position, shown by dotted lines in Fig. 7, I provide a duplicate of the mechanism shown for the same purpose in Fig. 2, and indicated by like characters plus the exponent $a$, said mechanism briefly described comprising a chain 48a, bell crank 49a, having a handle 51a and working over a toothed sector 52a. In this arrangement, the bell crank 49a is pivoted directly on the transverse rear bar of the rectangular frame 64.

In the form of the invention shown in Figs. 6 to 8, inclusive, the rotors 20 and 74' are driven from a prime mover in the nature of an internal combustion engine 96 through power transmission connections immediately to be described, the former in a clockwise direction with respect to Fig. 7, and the latter in a counterclockwise direction with respect to Fig. 6. The said power transmission connections from the engine 96 to the rotors comprise a bevel gear 96' fast on the engine crank shaft 97, and mesh with the comminutor shaft-mounted bevel gear 82, a V-pulley 98 mounted fast on the projected opposite end of the engine shaft 97, and a V-belt 99 running over the pulley 98, and a speed-reducing pulley 100 fast on one projected end of the sweeper rotor shaft 21 (see Fig. 6). The engine 96 is mounted on the H-shaped supplementary frame 88 and the projected end of the engine shaft 97 is journalled in a bearing 101, also carried by the generally H-shaped frame 88.

*Résumé of operation, Figs. 1 to 4, inclusive*

When the machine of these figures is advanced over the ground or other surface in a forward direction, which is from left to right with respect to Fig. 2 with the parts positioned as in Fig. 2, the operation will be substantially as follows: The sweeper rotor 20 of the collecting or pick-up mechanism and the comminutor rotor 24 will be rotated in a clockwise direction with respect to Fig. 2. That portion of the housing structure 8 defining the bottom of the comminutor chamber 10 will remain spaced above the ground sufficiently to freely pass over leaves and the like in the path of the machine. As leaves and the like are encountered by the sweeper rotor 20, they will be picked up thereby and rotated in a clockwise direction with respect to Fig. 2 about the interior of the arcuate wall portion 13 wherefrom they will be tangentially discharged into the passage 11 with sufficient velocity to carry the same into the comminutor chamber 10. The leaves and the like discharged from the passage 11 enter the comminutor chamber tangentially thereof and are immediately subject to the action of the rapidly revolving comminutor blades 30, which will carry the leaves and the like in a clockwise direction through the comminutor chamber 10 about the inner surface of the wall section 16 to the unrestricted outlet passage 19 wherethrough all the material, leaves and the like included, will be discharged onto the surface being traversed ahead of and in the path of travel and pick-up of the sweeper rotor 20 of the pick-up or gathering mechanism. Of course, the degree of comminuting action achieved on leaves during a single passage through the comminutor chamber will depend to a great extent upon the condition of the leaves, particularly with respect to moisture content. At any rate, the discharge from the comminutor chamber, under normal conditions, will include both relatively fine and relatively coarse particle or object sizes. Since the sweeper rotor 20 of the gathering and pickup mechanism is less efficient in picking up relatively fine objects, such as fine leaf particles, than in connection with relatively large objects, such as whole leaves or large leaf fragments, and this to a particularly marked degree when working over grass covered areas, the sweeper rotor will pass over and be ineffective on the relatively fine particles discharged from the comminutor chamber, but will pick up the larger particles and redeliver the same to the comminutor chamber 10 for recirculation therethrough along with newly encountered whole leaves and the like. In this manner, the machine disposes of leaves by the process of elimination. Of course, foreign objects of hard substance, such as stones, bones, sticks, golf balls and the like will be automatically discharged from the comminutor chamber 10 with a minimum possibility of causing damage to the elements of the comminutor. However, most of the larger foreign objects picked up by the sweeper rotor will be selectively eliminated before entering the passage 11 into the comminutor chamber by virtue of the restriction of the inlet end of said passage 11.

Of course, stones and other hard foreign objects passing through the comminutor chamber will be deposited on the surface being traversed ahead of and in the path of the pick-up or gathering mechanism, but these, in passing through the comminutor chamber, will inevitably set up a clatter which will warn the operator of their presence and give him plenty of opportunity to stop the machine and retrieve the foreign object before it is again picked up by the sweeper rotor 20 of the pick-up mechanism. As previously pointed out, should a long thick object be passed into the comminutor chamber 10 through the transversely elongated passage 11, such an object may at some time become turned within the comminutor chamber and become jammed between the rotor and the peripheral wall section 16 of the housing. In this case, of course, the arcuate peripheral wall section 16 will move outwardly toward its dotted line position of Fig. 2 to relieve undue pressure and permit passage of the said foreign object to the outlet passage 19, usually without damage to the mechanism.

As previously indicated, it may be desirable at times to operate the machine in a direction from right toward the left with respect to Fig. 2, and while this may be accomplished with the machine as illustrated, it would obviously be advantageous for this purpose to provide handle bars 6 and handles 7 at the right-hand end of the machine with respect to Fig. 2. Except under the most favorable conditions, this will result in decreased efficiency of the machine, since the recirculation principle is sacrificed. Hence, the machine of Figs. 1 to 4, inclusive, will usually be operated in a direction from right toward the left with respect to Figs. 1 to 4, inclusive, only under conditions where the amount of surface covered is of greater importance than maximum comminuting efficiency, although certain types of leaves when in an extremely dry and brittle condition may be broken down into quite satisfactory particle size by one passage through the comminutor chamber. A typical example calling for the operation of the machine of the type shown in Figs. 1 to 4, inclusive, in a direction from right to left with respect to Fig. 2, is on the rough areas of golf courses where the main objective is many times to merely distribute and break down the leaves sufficiently to uncover golf balls hidden thereunder to make the cover for golf balls less effective.

*Résumé of operation, Fig. 5*

As previously indicated, the species of the invention shown in Fig. 5 will operate like the species of Figs. 1 to 4, inclusive, when the displaceable comminutor wall section 62 is removed, with the following single exception, to wit: In this form of the invention, some of the fine particles of leaves and the like will be discharged through the highly restricted passages 61 in the arcuate wall section 16a before reaching the unrestricted outlet passage 19a. However, when the displaceable section 62 is in place, as shown in Fig. 5, the comminutor will function substantially so that material will be circulated and recirculated therein until broken down into fines of maximum particle size determined by the sizing of the highly restricted outlet passages 61.

*Résumé of operation, Figs. 6 to 8, inclusive*

The machine of these Figs. 6 to 8, inclusive, will, in most respects, operate very much as does the machine of Figs. 1 to 4, inclusive, or the machine of Fig. 5, when the perforate displaceable comminutor wall section or closure 62 is removed. The structure of Figs. 6 to 8, inclusive, does, however, offer the distinct advantage over the structures of the previously mentioned figures providing an improved comminutor structure wherein the comminuting action will be much more thorough and efficient as a result of a single passage through the comminutor chamber between the inlet passage 74 and outlet passage 76, than can possibly be accomplished in a comminutor of the type disclosed in Figs. 1 to 5, inclusive, under conditions mentioned just above. The reason for this increased comminutor efficiency in Figs. 6 to 8, inclusive, is the fact that all material which enters the comminutor chamber at its top above the upper end of the comminutor rotor 74 is caused by the comminutor rotor to whirl about the interior of the vertically disposed cross-sectionally circular cylindrical comminutor chamber, and therefore will travel in a spiral path between the inlet passage 74 and the outlet passage 76. This, of course, causes the leaves and most other material to travel numerous times about the axis of the comminutor rotor and chamber during its travel between the inlet and outlet passage of the comminutor chamber and, of course, the greater the travel within the comminutor chamber, the greater the efficiency of the machine. Of course, material is fed between the inlet and outlet passages 74 and 76, respectively, by gravity, so that light objects such as whole leaves and leaf fragments will tend to remain in the comminutor longer than will objects of higher specific gravity, such as stones, sticks, bones, golf balls and other foreign matter. It is also, of course, important to note, in connection with the structures of Figs. 6 to 8, inclusive, that the material passes through the comminutor chamber axially of the rotor 74 so that it is encountered and acted upon successively by each of the axial sets of comminutor blades 79, which further accounts for the high degree of efficiency achieved by this type of comminutor.

Because of the greater efficiency of the comminutor of Figs. 6 to 8, inclusive, the machine of these figures is even better adapted to operation in a direction from right toward the left with respect to Figs. 7 and 2 than is the machine of Fig. 2. It is to particularly facilitate this operation of the machine in a direction from right to left with respect to Fig. 7 that I provide the machine of Figs. 6 to 8, inclusive, with handle bars 69' extending from the right-hand end of the machine in Figs. 6 and 7, and which, while broken off, may be assumed to be provided with handles corresponding to the handles 71 at the left in Figs. 6 and 7. To still further facilitate operation of the machine in a direction from right to left in Fig. 7, I provide the handle bars 69 at their intermediate portions with friction joints 70', which permit folding of the handle bars 69 to the right and over the machine where they will be out of the way when not in use. The handle bars 69' at the other end of the machine may also be assumed to be provided with similar friction joints for the same purpose.

Of course, the cylindrical wall 75 of the comminutor chamber 73 could be imperforate as in Fig. 2 and interiorly serrated, if desired, but in the preferred embodiment illustrated, the cylindrical wall is highly perforated or foraminous to provide for the discharge of fines radially of the comminutor chamber. Hence, the fines will be discharged in all directions radially of the comminutor chamber, but the said discharge will be, nevertheless, confined to the width of the path traversed by the sweeper rotor by virtue of the baffle plates 92.

Additional advantages are as follows: Under certain conditions, the fibrous stems of leaves are so tough as to break down very slowly within the comminutor chamber, and, in fact, so slowly that they tend to accumulate within a comminutor chamber providing for only the discharge of fines to the extent that they will ultimately clog the comminutor, or seriously interfere with the comminutor action. This, of course, cannot happen within a comminutor of the type herein disclosed due to the provision of a substantially unrestricted outlet passage. Similarly, under certain conditions, freshly cut grass, long dead grass and the like will present a similar problem in comminutors having provision only for the discharge of finely divided particles, but, of course, such tenacious grass and the like will be readily discharge from comminutors of the type herein disclosed.

It should be herein pointed out that the purpose of oppositely pitching, to a slight extent, circumferentially adjacent comminutor blades 79 is to increase the comminutor surface area traversed by the tips of the blades without, however, producing any definite draft tendency through the comminutor chamber. In other words, the reverse pitching of circumferentially alternate blades neutralizes the draft-producing tendency. I have, however, found that in some instances it is desirable to pitch all of the blades 79 of the top series thereof adjacent the intake passage in a common direction, whereby to initiate the flow by gravitation through the comminutor chamber. Furthermore, it will be appreciated that the reverse pitching of circumferentially alternate comminutor blades 79 will tend to cause the material to travel a more tortuous path within the comminutor chamber and to avoid inactive or dead spots or paths where the action of the comminutor blades on the material is relatively ineffective.

While I have herein described several embodiments which my invention may assume in practice, it will, of course, be understood that the same is capable of further modification without departing from the spirit and scope of the invention as expressed in the following claims.

I claim:
1. In a mobile leaf gathering, comminuting and redistributing machine, ground wheels, a frame structure mounted on the ground wheels, a rigid unitary housing structure operatively associated with the frame and defining an open bottomed sweeper chamber and a comminutor chamber spaced from the sweeper chamber in a direction longitudinally of the machine and in receiving communication with the sweeper chamber, said comminutor chamber having a redistributing discharge passage, a horizontally disposed power-driven sweeper rotor working within the sweeper chamber and through the open bottom thereof, a power driven comminutor rotor within the comminutor chamber, means pivotally mounting the housing on the frame structure on a horizontal axis extending transversely of the machine, the axis of said pivotal mounting being adjacent the comminutor chamber and spaced from the sweeper rotor and sweeper chamber in a direction longitudinally of the machine, whereby to permit upward and downward swinging movements of the sweeper rotor and sweeper chamber with respect to the frame while substantially maintaining the elevation of the bottom of the comminutor chamber.

2. The structure defined in claim 1 together with ground engaging means carried by that portion of the housing unit defining the sweeper chamber and supporting the sweeper rotor and chamber directly from the ground.

3. The structure defined in claim 1 in which the comminutor chamber is defined in part by a generally cylindrical wall disposed on a horizontal axis extending transversely of the machine, the comminutor rotor being concentrically disposed within said generally cylindrical wall portion, and the bottom of the comminutor chamber is spaced above the ground, and the said pivot axis of the housing unit is substantially coincidental with the comminutor rotor axis.

4. The structure defined in claim 1 in which the comminutor chamber is defined in part by a generally cylindrical wall, the axis of which extends generally upwardly and downwardly, the bottom of the cominutor chamber being spaced above the ground and the axis of the pivotal connection between the housing unit and frame structure being located adjacent the end of the comminutor chamber most remote from the sweeper chamber.

JACOB A. RONNING.

REFERENCES CITED

The following references are of record in the file of this patent:

UNITED STATES PATENTS

| Number | Name | Date |
|---|---|---|
| 1,457,424 | Bunch | June 5, 1923 |
| 1,648,341 | Goble | Nov. 8, 1927 |
| 1,987,371 | Rudd | Jan. 8, 1935 |
| 2,105,803 | Barnes | Jan. 18, 1938 |
| 2,162,783 | Moyer | June 20, 1939 |
| 2,242,922 | Poynter | May 20, 1941 |
| 2,302,973 | Sargent | Nov. 24, 1942 |
| 2,323,262 | Warren | June 29, 1943 |
| 2,368,331 | Seaman | Jan. 30, 1945 |
| 2,436,011 | Lucas | Feb. 17, 1948 |
| 2,486,969 | Nelson | Nov. 1, 1949 |